July 7, 1942.  E. M. SPLAINE  2,288,657
OPHTHALMIC MOUNTING
Filed Jan. 4, 1940  2 Sheets—Sheet 2
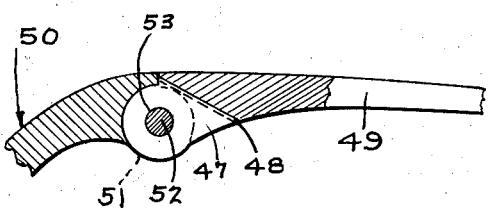
FIG. IX
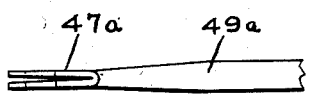
FIG. X
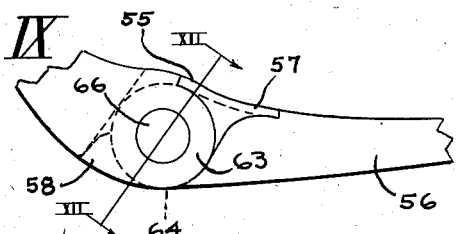
FIG. XI
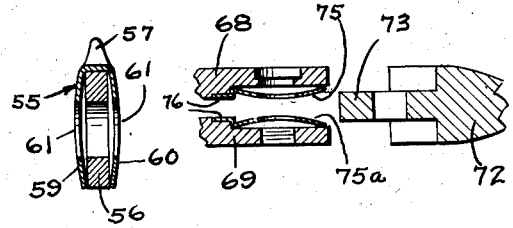
FIG. XII  FIG. XIII  FIG. XIV
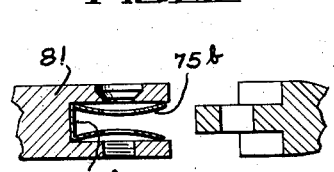
FIG. XV
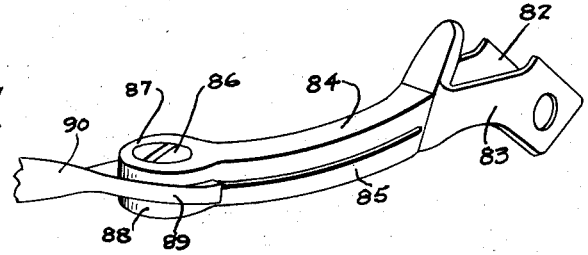
FIG. XVI
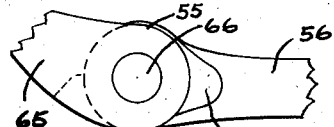
FIG. XIX
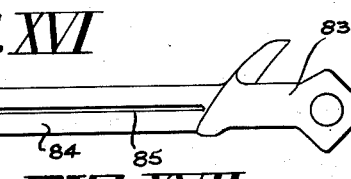
FIG. XVII
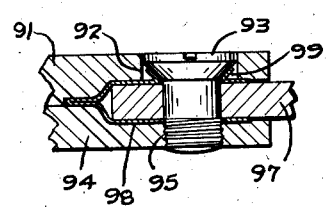
FIG. XVIII
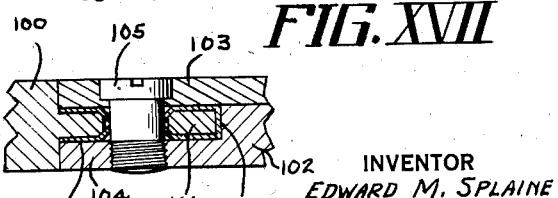
FIG. XX
INVENTOR
EDWARD M. SPLAINE
BY
Harry H. Styll
ATTORNEY Patented July 7, 1942

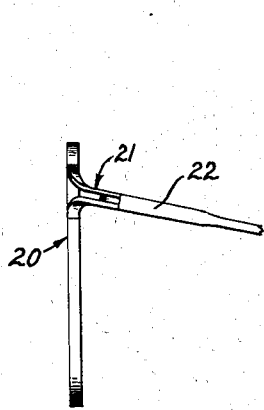
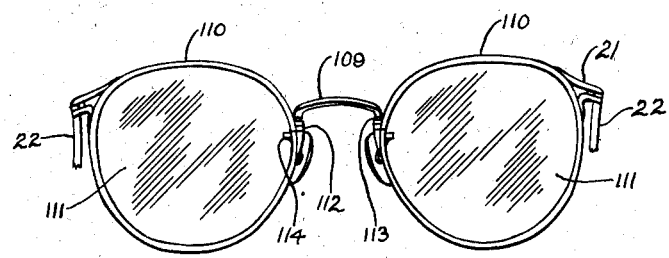
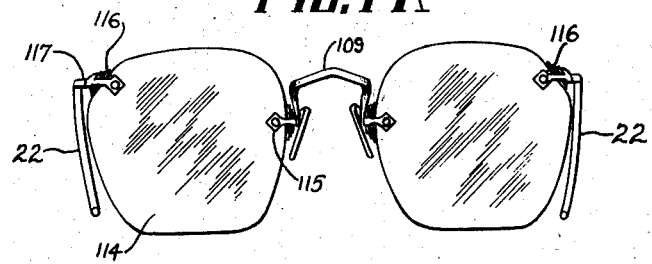
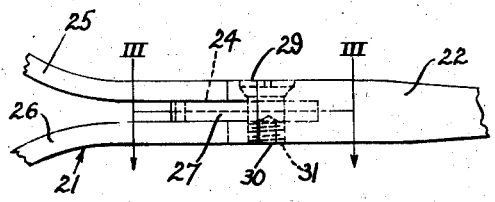
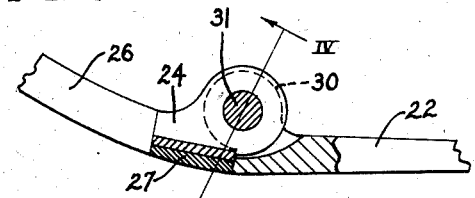
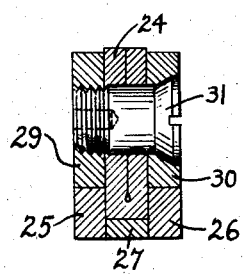
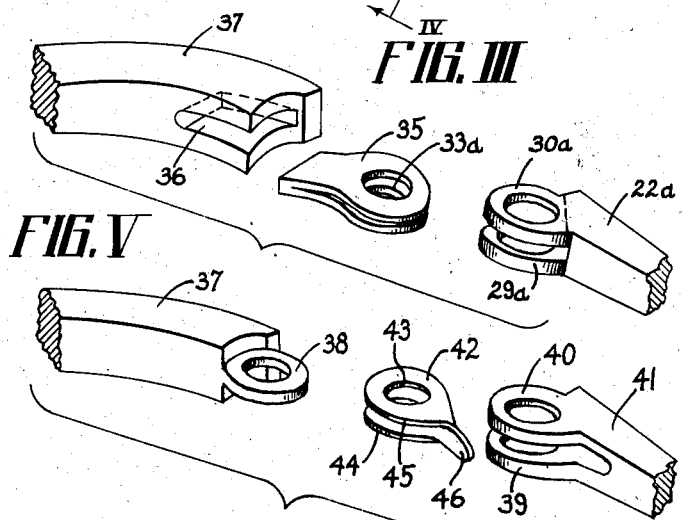
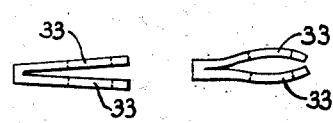
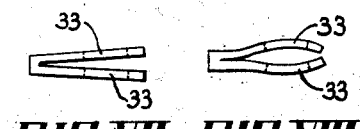

2,288,657

UNITED STATES PATENT OFFICE 2,288,657

OPHTHALMIC MOUNTING

Edward M. Splaine, Southbridge, Mass., assignor to American Optical Company, Southbridge, Mass., a voluntary association of Massachusetts Application January 4, 1940, Serial No. 312,443

4 Claims. (Cl. 88—53)

The present invention relates to an improvement in ophthalmic mountings and more particularly to the construction of the pivot or hinge by which the temple member is connected to the member of the mounting which engages the lens.

This application is a continuation in part of my copending application, Serial No. 110,659, filed November 13, 1936.

An object of the present invention is to provide such a construction of hinge or pivot for the temple member of an ophthalmic mounting as will maintain the friction therein more nearly constant throughout the life of the mounting.

The problem of avoiding free swinging of the temple members of an ophthalmic mounting is a familiar one to those engaged in the manufacture of such mountings, and has long engaged the attention of designers in that industry. It is only through use that the excellence of the hinge or joint is determined since a hinge construction which is satisfactory when the mounting leaves the factory may swing more and more freely the longer the mounting is used. In other words, the frictional engagement between the relatively movable surfaces in the hinge or pivot does not remain constant.

I have discovered that one difficulty lies in the character of the metal forming these surfaces, and I overcome this difficulty by employing different metals for the contacting surfaces. I have discovered that where the contacting surfaces are similar in character, swinging of the temple member roughens the contacting surfaces; hence it is frequently impossible for the fitter to adjust the hinge or joint tight without danger of its becoming "frozen" or binding so tightly as to interfere with swinging of the temple. Accordingly the hinge or joint is commonly loose enough, as fitted for the wearer, so as to soon exhibit the looseness in swinging which has been above pointed out as a defect. I have discovered that, on the other hand, if different metals are employed and more particularly steel in contact with a softer metal or alloy, such as copper, bronze, German silver, or other metal or alloy suitable for use in ophthalmic mountings, the wear between these contacting surfaces is of such a character that even though the joint is so constructed and adjusted for use that there is no objectionable binding, long continued use does not cause objectionable looseness of swing of the temples. This I believe to be due to a tendency on the part of the harder surface to burnish the softer surface, giving a smooth bearing.

Another difficulty arises, as I have discovered, from the methods now used for manufacturing the members of the ophthalmic mounting. The joint or hinge, such as customarily used in ophthalmic mountings, calls for a forked end on one member within which is received a lug or tongue on the end of the other member. It is necessary to reduce the cross section of the tongue so as to enter into the forked end of the other member, and two methods have been in general use for forming this tongue. One method is to mill away the two sides of the tongue so as to reduce its thickness sufficiently to enter into the forked end of the other member. As this forked end is produced by a milling operation, this means that two milled surfaces move in contact with each other during the swinging of the temple member. Such surfaces are, of course, comparatively rough and will bind unless the joint is so loose, when leaving the factory, that there is danger of objectionable free swinging of the temple members as soon as these surfaces have become somewhat worn after a short period of use.

Another method for forming the tongue or end is to swage the same by means of a die. Swaging requires that the metal flow toward the tip of the end with a resulting tendency towards decreasing thickness in the direction of flow. In other words, the source of the flow of metal is likely to be the thickest portion of the swaged end. Moreover, as the die wears away with use, it naturally wears most in those portions which engage the metal with the greatest pressure to reduce its cross section. Accordingly, the die becomes most worn at the place where the metal tends to be the thickest. The general tendency therefore is for the swaged end to taper. A tapered part in a hinge means that all but a small fraction of the surface of this tapered part is out of contact with the milled recesses in the other part of the hinge or joint. This is objectionable because wear is rapid and the objectionable loose swinging soon results.

I have discovered that this difficulty is overcome by inserting a piece of metal at the end of the respective part instead of the milled or swaged tongue. Such an insert may be made by blanking it out of a sheet which is of even thickness due to rolling or a similar forming operation. This metal insert does not have the rough surface which results from the milling operation, above referred to, nor is it tapered as is apt to be the result of a swaging operation as above pointed out.

This metal insert may, of course, be a part of the temple member or it may be a part of the lens engaging member.

Moreover, for the purpose of providing diversity of metal surfaces for frictional engagement in the hinge construction, a metal insert may be employed for the forked end instead of for the tongue end. This metal insert will in such case be of a different metal than the tongue end and will be in sliding engagement therewith for maintaining the friction, which resists swinging movement of the temple member, substantially constant.

As a further feature of my invention, I may incorporate resilient pressure in the hinge construction for maintaining the relatively movable surfaces in substantially constant frictional engagement. Such a resilient construction may be provided in a number of ways, as for instance, by forming the above mentioned metal insert of resilient metal such as sold under the trade name "Inconel," "Stainless Steel" and other non-corroding metals or alloys capable of taking a temper.

While a number of illustrative embodiments of my invention are illustrated in the accompanying drawings, it will be apparent the invention is not restricted to a specific embodiment, but that changes may be made in the details of construction and arrangement of the parts within the scope of the invention as defined in the appended claims.

In the accompanying drawings which are merely illustrative of my invention:

Fig. I is a view in side elevation of an ophthalmic mounting;

Fig. IA is a front elevation of a rim type mounting embodying the invention;

Fig. IB is a front elevation of a rimless type of mounting embodying the invention;

Fig. II is a fragmentary view in side elevation of the hinge construction shown in Fig. I;

Fig. III is a view principally in a section on the line III—III of Fig. II;

Fig. IV is a transverse sectional view on the line IV—IV of Fig. III;

Fig. V is an exploded view in perspective of parts of a modified form of hinge construction;

Fig. VI is a similar view of still another form of hinge construction;

Fig. VII is an end view of an insert in the hinge construction;

Fig. VIII is a similar view of a modified form of insert;

Fig. IX is a view similar to Fig. III of a modified form of joint;

Fig. X is a view in side elevation of the pivot and of a temple according to a modified construction;

Fig. XI is a view similar to Fig. IX of a still further modification of hinge construction;

Fig. XII is a sectional view through the temple and insert before they are assembled with the endpiece, the plane of the section being indicated by the line XII—XII in Fig. XI;

Fig. XIII shows in axial section still another form of hinge construction;

Fig. XIV is a similar sectional view of further modification;

Fig. XV is a sectional view of a modification of the hinge construction shown in Fig. XIII;

Fig. XVI is a perspective view of the hinge connecting an endpiece with the end of a temple;

Fig. XVII is a view in side elevation of the construction shown in Fig. XVI;

Fig. XVIII is a view similar to Fig. XIV of a modified construction;

Fig. XIX is a view of a modification of the hinge construction shown in Fig. XI; and Fig. XX is a sectional view of still another form of hinge construction.

Fig. I portrays an example of an ophthalmic mounting in which my invention may be embodied. This mounting comprises a lens engaging member 20 which in the example shown is provided with an endpiece 21. While the invention is applicable equally as well to rimless mountings, the example shown is a mounting having eye wires for mounting the lenses, and the endpieces 21 are secured to these eye wires. To the lens engaging members and specifically to the endpieces 21 are pivoted the temples 22, of which but one is shown in Fig. I.

Fig. IA represents a rim type mounting embodying the features of this invention and comprises a bridge member 109, and a pair of rims 110 which support lenses 111 therein. The rims have their ends joined at 112 by screw or other suitable means 113, and the rims are joined to the bridge adjacent said joining 112 and pad arms 114 are also connected to the rims adjacent the connection thereof with the bridge. Suitable endpiece means 21 are attached to the rims on the temporal sides thereof and support temples 22.

Fig. IB represents a rimless type of mounting embodying the features of this invention and comprises lenses 114 joined by a bridge member 109 through suitable lens straps 115 and supporting temple members 22 by means of lens straps 116 and endpieces 117. It is the pivot between the endpieces 21 and 117 and the temples 22 in which is positioned the friction member which is the embodiment of this invention.

The hinge construction by which the temple 22 is pivoted to the lens engaging member 20 is shown more in detail in Figs. II, III and IV. An insert 24 of corrosion resisting steel such as the well known alloy containing 18% chromium and 8% nickel is soldered in place in the end of the endpiece 21. In the mounting shown by way of example in these figures, the endpiece 21 is formed of upper and lower straps 25 and 26 welded to the eye wire, and affording a slot between them at their ends for receiving the insert 24. The insert may, if desired, be hidden behind a filler 27, so that the endpiece may appear to be formed throughout of the same metal. The temple 22 is provided with a forked end in the form of a pair of ears 29 and 30 which are perforated to receive the hinge screw 31.

I have devised a novel method for producing the resilient frictional engagement between the relatively movable surfaces in the hinge or joint. The insert 24 is readily formed from a sheet of resilient metallic material such as "Inconel" or "Stainless Steel," the sheet being first doubled, i. e. folded and then cut to the required shape as by stamping. If the two parts of the doubled insert lie against each other when made in this manner, the desired resilience can be obtained by inserting a thin blade between the two parts of the insert and slightly separating these parts. Such a resilient insert is illustrated in Figure VII. The resilience may also be obtained by slightly cupping each part of the insert outwardly, this form of insert being illustrated in Fig. VIII. The two parts of the insert are provided with aligned perforations 33 for receiving the hinge screw 31.

The insert is first soldered in place in the endpiece 21, and is then inserted between the ears 29 and 30. The hinge screw 31 is then threaded into place and drawn down tight enough to provide the desired frictional engagement between the ears 29 and 30 and the two outer surfaces of the insert 24. Tightening the screw 31 reacts against the resilience in the insert 24 by tending to press the two parts of the insert together. This is true of both the form of insert shown in Fig. VII and the form shown in Fig. VIII. In the latter case there is a tendency for the frictional engagement to occur more particularly in the immediate neighborhood of the perforations 33, the extent of such frictional engagement increasing as the screw 31 is tightened down.

In the embodiment shown in Fig. V, the insert 35 is generally similar to the insert 24 but is inserted into a milled recess 36 in an endpiece 37 of the lens engaging member. This insert is soldered or welded in its recess and its projecting portion is received between the ears 29a and 30a of the temple 22a. A pivot pin or screw, such as illustrated at 31 in Fig. IV, will be inserted into the perforations in the ears of the temple end and through the perforations 33a of the insert 35. The two parts of the insert afford resilience for maintaining the frictional engagement between the insert and the ears 29a and 30a substantially constant.

It will be understood that the insert 35 may be employed as shown, or an insert of the cupped type such as shown in Fig. VIII may be employed in this embodiment of hinge construction. Moreover, the insert may be a solid piece of metal, omitting the feature of resiliency.

In the form of hinge construction shown in Fig. VI, the endpiece 37 is provided with a tongue or projecting end 38 which is adapted to be received between the ears 39 and 40 of the temple 41. An insert 42 having perforations 43 is so formed as to have spaced portions 44 and 45. This type of insert may be conveniently stamped from sheet metal, the two portions 44 and 45 being then folded into general parallelism. This type of insert, when soldered or in other suitable manner secured in the forked end of the temple 41, forms a liner for the two ears 39 and 40; and the portions 44 and 45 lie in frictional engagement with the opposite faces of the tongue 38 when the latter is inserted between the ears of the temple 41. In order to spot weld this insert in the forked end of the temple 41, I prefer to provide the insert with a tab or projection 46 which may be affixed by spot welding to the temple 41. A pivot pin or screw similar to the one shown in Fig. IV will be inserted through the perforations in the ears 39 and 40, the perforation in the tongue 38, and the perforations 43 in the insert 42. Resilient pressure may be incorporated in this form of hinge construction by positioning the portions 44 and 45 closer together than the thickness of the tongue 38 so that the latter has to force these two portions apart when it is inserted in place as above described.

In the embodiment of my invention shown in Fig. IX, the insert 47 is similar to the insert illustrated in Fig. III, but is positioned, as by soldering or welding, in a milled recess 48 in the temple 49. The endpiece 50 is formed with a pair of ears of which the ear 51 is hidden beneath the insert 47 in Fig. IX. The pivot pin or screw 52 passes through these ears and through the central perforation 53 in the insert. The latter may be either of the type shown in Fig. VII or of the type shown in Fig. VIII.

Instead of the temple and insert shown in Fig. IX, I may employ a modified form of temple 49A having attached to its end an insert 47A (see Fig. X). The latter may be attached to the temple 49A by welding, soldering, or the like.

In the embodiments shown in Figs. XI, XII and XIX, the insert 55 is soldered or welded in place on the end of the temple 56, the insert being formed with a lug 57 or 57'. In the form shown in Figs. XI and XII, the lug 57 extends along one side of the temple for attachment to the temple, preferably by spot welding. The temple proper is formed with a tip 58 which limits the swinging movement of the temple when the latter is swung from folded to open position.

In the form shown in Fig. XIX the insert is attached by soldering or spot welding the lugs 57' to both sides of the temple. It is furthermore within the scope of my invention to omit the lugs 57 or 57' and attach the fold of the insert 55 to the side of the temple 56 by welding or the like.

The insert 55 may conveniently be stamped from sheet metal and folded so that its two parts 59 and 60 may receive between them the perforated end of the temple 56 with such perforation in alignment with the perforations 61 in the insert. As shown in Fig. XII the portions 59 and 60 are slightly cupped outwardly. This incorporates the desired resilient pressure in the hinge construction when the insert 55 secured on the end of the temple 56 is inserted between the ears 63 and 64 of the endpiece 65. A hinge pin or screw 66 assemblies the temple and endpiece, and may be tightened sufficiently to provide the desired frictional engagement between the parts of the hinge construction.

With the form of construction shown in Fig. XIII, the endpiece of the ophthalmic mounting is in two parts 68 and 69. The temple 72 ends in a tongue 73 which is perforated to receive the hinge screw. The head of the latter is received in a recess in the part 68 of the endpiece, and the end of the screw is threaded into the part 69. The insert may conveniently be stamped out of sheet metal and somewhat dished to provide resiliency. The tongue 73 is received between the upper and lower portions 75 and 75a of the insert. Each of these portions is formed with a flange 76 which is secured as by spot welding to a depression in the inner face of each part 68 or 69 of the endpiece. When the screw is tightened it adjusts the frictional engagement between the insert and the tongue 73.

With the form of construction shown in Fig. XIV the endpiece is in two parts 68a and 69, which are held together by a screw 70; and the screw 70 may be removed and the parts 68a and 69 separated without change in the hinge between the endpiece and the temple 72. In this embodiment, one portion of the insert 79 is so shaped as to lie flat against the part 69 of the endpiece. If desired both portions of the insert 79 may be flat so as to eliminate resiliency. In the embodiment shown, the opposed portion of the insert is dished outwardly to underlie the head of the screw 80; and the part 68a of the endpiece is provided not only with an opening for receiving the head of the screw 80 but also with a communicating recess for accommodating this dished portion of the insert 79. The shape of these openings is such that the part 68a may be removed without loosening the screw 80. When the screw 80 is tightened, it forces the insert against the flat face of the part 69 of the endpiece. The construction is resilient due to the yielding action of the dished portion of the insert.

Fig. XV illustrates a construction embodying some of the features of the form of hinge shown in Fig. XIII, but in this case the endpiece 81 is not split. The insert 75b is spot welded at 76b in the slot in the endpiece 81. Both the upper and lower portions of the insert are dished to provide resilient pressure on the tongue or end of the temple which is forced in between them. The usual pivot screw is tightened to clamp the two ears of the endpiece on the insert and temple.

Figs. XVI and XVII illustrate a modified construction; and although an endpiece of the rimless type having straps 82 and 83 is shown in these figures, this type of construction is applicable equally as well to the type of ophthalmic mounting having eye wires for clamping the lenses.

The endpiece 84 is elongate and is split nearly its entire length, as shown at 85, so that minimum resistance is opposed to the action of the pivot screw 86 in drawing the ears 87 and 88 of the hinge construction toward each other. This permits a nice adjustment of the clamping action of these ears upon the tongue 89 projecting from the end of the temple 90.

The form of my invention illustrated in Fig. XVIII is a modification of the constructions illustrated in Figs. XIII and XIV. The part 91 of the endpiece is provided with an opening 92 for receiving the tapered head of the pivot screw 93. The other part 94 of the endpiece has a threaded opening 95 into which the lower portion of the screw extends. The end of the temple 97 is received in a slotlike recess between the parts 91 and 94 of the endpiece and is provided with a perforation through which the screw 93 extends. The insert 98 may be stamped out of sheet metal and reshaped to the form illustrated. In Fig. XVIII this insert has a portion which lies flat against the face of the part 94 and a corresponding portion disposed on the other side of the temple 97. The first mentioned portion of the insert is perforated in like manner as the temple; and the second mentioned portion has an opening for receiving the screw 93, which opening is surrounded by parts 99 of the metal which are bent back so as to lie against the tapered head of the screw when the latter is tightened down. This type of construction provides frictional engagement between the insert and the part 94 of the endpiece when the screw 93 is tightened down.

Fig. XX illustrates a construction which embodies in the hinge or joint an insert whose purpose is to position the pivot screw centrally of an enlarged opening through the tongue forming part of the endpiece or temple, as the case may be. In the specific form illustrated, the temple 100 is provided with a tongue or projecting end 101 while the endpiece 102 is formed with ears 103 and 104. The customary pivot screw 105 passes through the perforations in the ears 103 and 104 and the perforation in the tongue 101. The insert 107 is spot welded at 108 to the endpiece 102 as in the form of my invention illustrated in Fig. XIII. The endpiece 102 itself is split so as to facilitate insertion of the tongue 101.

Around the perforations in both the upper and lower portions of the insert 107 the metal is somewhat depressed or dished inwardly and both sides of the perforation in the tongue 101 are correspondingly countersunk. The conical inner surfaces on the upper and lower portions of the insert rest against the upper and lower conical surfaces surrounding the perforation in the tongue 101 so that there is a tendency for the insert 107 to remain centered relative to the tongue 101 even though the pivot screw 105 does not contact the tongue 101. The screw 105 may be tightened to clamp the ears 103 and 104 upon the insert 107 and the tongue 101 to provide the desired frictional engagement. On the other hand, the tongue 101 is normally out of contact with the pivot screw 105 thereby avoiding any ratchet action on the screw. Tendency for the screw to back out is thereby avoided.

It will be apparent from the above discussion of the illustrative embodiments of my invention which are shown in the drawings, that due to the resilient construction of the hinge the relatively rotatable surfaces in the hinge maintain a more even engagement. This means that the action of the joint is more uniform for a long period of time than with the customary constructions of joint.

In the embodiment of my invention illustrated in Figs. XVI and XVII, this resiliency is not present; but it will be noted that the length of the endpiece permits the ears 87 and 88 to accommodate themselves to the end or tongue 89 of the temple. If the latter is somewhat tapered, there is sufficient flexibility in the endpiece to permit the ears 87 and 88 to flatly engage the opposed surfaces of the tongue 89.

The doubled or folded insert has the advantage, above referred to, that the upper and lower portions of the insert tend to yieldably engage the ears of the endpiece or temple as the case may be. There is an additional advantage in using a folded insert when the latter is soldered in place. If one attempted to solder in a slot two separate pieces of metal instead of the single folded insert, the solder would flow under capillary attraction in between the two pieces of metal so as to unite them. The folded insert, on the other hand, keeps the solder on the outside of the insert and the crevice in the fold remains clear of solder so that the resiliency of the insert is retained.

While I have illustrated a number of embodiments which my invention may assume, it will be understood that my invention may be otherwise embodied and practiced within the scope of the following claims.

Having described my invention I claim:

1. In an ophthalmic mounting, a pair of lenses, a bridge, temple supporting members, lens holding means connecting said lenses to the bridge and the temple supporting members and temple members pivoted to said temple supporting members, one of said members having a slotted recess adjacent one end thereof and the other of said members having a tongue extending into said recess, resilient means constituting sheet metal-like portions fitting between the side surfaces of the recess and the adjacent side surfaces of the tongue, said sheet metal-like portions being of a different hardness than the material of said members and having characteristics for introducing a biasing action which causes a frictional relation to exist between the resilient portions and the respective side surfaces of the recess and the tongue, at least one of the said portions having an extension portion anchored to one of said members so as to retain said portion substantially against rotation during the pivotal movement of the temple, said members having aligned openings therein and means in said aligned openings for pivotally connecting one of said members to the other with the resilient portions tending to frictionally limit said pivotal movement, said portions being inherently resilient and self-functioning in introducing the biasing effect.

2. In an ophthalmic mounting, in combination, a temple member and a supporting member for said temple, one of said members having a slotted recess adjacent one end thereof and the other of said members having a tongue extending into said recess, resilient means constituting sheet metal-like portions fitting between the side surfaces of the recess and the adjacent side surfaces of the tongue, said sheet metal-like portions being of a different hardness than the material of said members and having characteristics for introducing a biasing action which causes a frictional relation to exist between the resilient portions and the respective side surfaces of the recess and the tongue, at least one of the said portions having an extension portion anchored to one of said members so as to retain said portions substantially against rotation during the pivotal movement of the temple, said members having aligned openings therein and means in said aligned openings for pivotally connecting one of said members to the other with the resilient portions tending to frictionally limit said pivotal movement, said portions being inherently resilient and self-functioning in introducing the biasing effect.

3. In an ophthalmic mounting the combination of a temple member and a supporting member for said temple, one of said members having a recessed portion adjacent one end thereof with spaced bearing surfaces when the parts are in assembled relation, and the other of said members having an end portion adapted to be positioned in cooperative relation with said recessed end, resilient means constituting sheet metal-like portions having side bearing surfaces frictionally engaging the spaced bearing surfaces of the recessed portion when the parts are in assembled relation with each other, and at least one of said sheet metal-like portions having a reduced extension portion anchored to one of said members so as to retain said portion substantially against rotation when the bearing surfaces are moved relative to each other in the direction of pivotal movement of one of said members relative to the other, at least one of said members and said sheet metal-like portions having aligned openings for pivotal connection thereof, said sheet metal-like portions being of a different hardness than the material of said members and having characteristics for introducing a biasing action which causes a frictional relation to exist between said resilient portions and the respective bearing surfaces of the slotted portion for frictionally limiting said pivotal movement, said sheet metal-like portions being inherently resilient and self-functioning in introducing the biasing effect.

4. In an ophthalmic mounting, a pair of lenses, a bridge, temple supporting members, lens holding means connecting said lenses to the bridge and temple supporting members and temple members pivotally associated with said temple supporting members, one of said members having a recessed portion adjacent one end thereof with spaced bearing surfaces when the parts are in assembled relation, and the other of said members having an end portion adapted to be positioned in cooperative relation with said recessed end, resilient means constituting sheet metal-like portions having side bearing surfaces frictionally engaging the spaced bearing surfaces of the recessed portion when the parts are in assembled relation with each other, and at least one of said sheet metal-like portions having a reduced extension portion anchored to one of said members so as to retain said portion substantially against rotation when the bearing surfaces are moved relative to each other in the direction of pivotal movement of one of said members relative to the other, at least one of said members and said sheet metal-like portions having aligned openings for pivotal connection thereof, said sheet metal-like portions being of a different hardness than the material of said members and having characteristics for introducing a biasing action which causes a frictional relation to exist between said resilient portions and the respective bearing surfaces of the slotted portion for frictionally limiting said pivotal movement, said sheet metal-like portions being inherently resilient and self-functioning in introducing the biasing effect.

EDWARD M. SPLAINE.